United States Patent [19]

Mio et al.

[11] Patent Number: 5,586,233
[45] Date of Patent: Dec. 17, 1996

[54] METHOD AND APPARATUS FOR CREATING MULTI-GRADATION DATA

[75] Inventors: Haruhiko Mio; Kazuhito Fukuoka; Yasunori Kanda, all of Kawasaki, Japan

[73] Assignee: Fujitsu Limited, Kawasaki, Japan

[21] Appl. No.: 633,657

[22] Filed: Apr. 17, 1996

Related U.S. Application Data

[63] Continuation of Ser. No. 108,534, Aug. 19, 1993, abandoned.

[30] Foreign Application Priority Data

Feb. 26, 1993 [JP] Japan .................................. 5-038864

[51] Int. Cl.$^6$ ...................................................... G09G 1/16
[52] U.S. Cl. ............................................. 395/128; 395/167
[58] Field of Search ..................................... 395/150, 128, 395/151, 132; 358/443, 445, 447, 448, 458

[56] References Cited

U.S. PATENT DOCUMENTS

| | | | |
|---|---|---|---|
| 4,454,506 | 6/1984 | Netravali et al. | 345/136 |
| 4,533,942 | 8/1985 | Gall et al. | 358/524 |
| 4,851,825 | 7/1989 | Naiman | 345/132 |
| 5,018,883 | 5/1991 | Fujita | 395/109 |
| 5,029,107 | 7/1991 | Lee | 395/145 |
| 5,065,149 | 11/1991 | Marsh et al. | 345/132 |
| 5,226,116 | 7/1993 | Sasaki | 395/150 |
| 5,327,258 | 7/1994 | Ueda | 358/448 |

OTHER PUBLICATIONS

Foley et al.; Computer Graphics: Principles and Practice; 2nd Edition; 1990; pp. 127–137, 568–574, 621–623.

*Primary Examiner*—Heather R. Herndon
*Assistant Examiner*—Cliff N. Vo
*Attorney, Agent, or Firm*—Staas & Halsey

[57] ABSTRACT

Method and apparatus for creating multi-gradation data. The method and apparatus generates data having pixel values for respective pixels which comprise each of a plurality of characters in a font, and divides the respective pixels into a plurality of unit regions, a number of the respective pixels being obtained by multiplying a desired number of pixels by a number of pixels included in one unit region of the plurality of unit regions; extracts, for every unit region of the plurality of unit regions, the generated data; generates a multi-gradation data including a plurality of gradation values each gradually representing a different pixel brightness value, by converting, for every unit region, the data into the multi-gradation data in accordance with a plurality of pixel values included in the extracted unit region; and reduces the number of the respective pixels to the desired number of pixels by representing each unit region including the number of pixels with one pixel having a pixel value determined in accordance with the multi-gradation value.

28 Claims, 10 Drawing Sheets

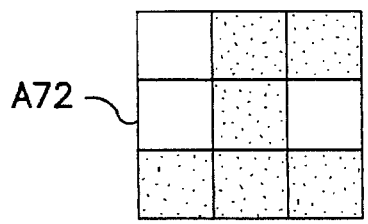
FIG. 5
| 0 | 0 | 0 | 1 | 1 | 0 | 0 | 0 |
|---|---|---|---|---|---|---|---|
| 0 | 0 | 0 | 4 | 4 | 0 | 0 | 0 |
| 0 | 0 | 0 | 4 | 6 | 0 | 0 | 0 |
| 0 | 0 | 5 | 1 | 3 | 3 | 0 | 0 |
| 0 | 0 | 5 | 3 | 3 | 7 | 0 | 0 |
| 0 | 2 | 2 | 0 | 0 | 4 | 2 | 0 |
| 1 | 6 | 1 | 0 | 0 | 2 | 7 | 1 |
| 0 | 0 | 0 | 0 | 0 | 0 | 0 | 0 |
FIG. 6
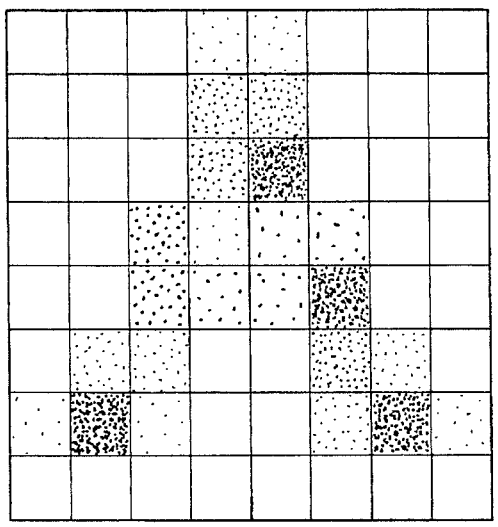
FIG. 7

| 0 | 0 | 0 | 0 | 4 | 0 | 0 | 0 |
|---|---|---|---|---|---|---|---|
| 0 | 0 | 1 | 2 | 4 | 2 | 1 | 0 |
| 0 | 1 | 3 | 0 | 0 | 0 | 0 | 0 |
| 0 | 2 | 0 | 1 | 4 | 2 | 1 | 0 |
| 1 | 0 | 0 | 0 | 4 | 0 | 0 | 0 |
| 0 | 0 | 0 | 0 | 4 | 0 | 0 | 0 |
| 0 | 0 | 0 | 2 | 4 | 0 | 0 | 0 |
| 0 | 0 | 0 | 0 | 0 | 0 | 0 | 0 |

METHOD AND APPARATUS FOR CREATING MULTI-GRADATION DATA

This application is a continuation of application Ser. No. 08/108,534, Aug. 19, 1993, now abandoned.

BACKGROUND OF THE INVENTION

This invention relates to a method and an apparatus for generating multi-gradation data to represent characters according to light and shade information.

In a conventional computer system, fonts are used for representing characters. In a conventional computer system, each character in a given font is specified as a small rectangular bitmap, a ones and zeros representation of the rectangular array of pixels. For example, an alphabet is composed of eight pixels×eight pixels. A kanji character is composed of sixteen pixels×sixteen pixels. A raster display of the computer system stores the display primitives such as lines and characters in a refresh buffer in terms of their component pixels. The complete image on the raster display is formed from the raster, which is a set of horizontal raster lines, each a row of individual pixels. The raster is thus stored as a matrix of pixels representing the entire screen area. The entire image is scanned out by a video controller, allowing the constant refresh of the display. As known in the arts, there are two fundamental types of refresh: interlaced and noninterlaced. The former is used in broadcast television and in raster display designed to drive regular television. The refresh cycle is broken into two fields, each lasting 1/60 second; thus, a full refresh lasts 1/30 second. All odd-numbered scan lines are displayed in the first field, and all even-numbered ones are displayed in the second. The purpose of the interlaced scan is to place some new information in all areas of the screen at a 60-Hz rate, since a 30-Hz refresh rate tends to cause flicker. On the other hand, noninterlaced scan is used to scanout one raster line at a time from top to bottom. In other words, scanout starts in the upper left-hand corner of the display and simultaneously moves left to right and top to bottom to put a series of zig-zag lines on the screen.

Some television sets for home use include a device applying an interlaced scan technique. In this event, flicker appears on the screen. Accordingly, if small characters are displayed on the screen, flicker hinders clear recognition of the characters.

SUMMARY OF THE INVENTION

The present invention is made with respect to the above and an object thereof is to provide a method and an apparatus for generating multi-gradation data for ensuring clear recognition of the characters even when the characters which should be displayed on a screen display device are small characters.

An apparatus for generating multi-gradation data according to the present invention comprises a data generating unit, a region extracting unit, and a multi-gradation data generating unit.

The data generating unit generates data having pixel values for respective pixels which comprise each of characters to represent each of characters in a font.

The region extracting unit extracts, for every unit region, the data generated by said data generating unit.

The multi-gradation data generating unit generates a multi-gradation data including a plurality of gradation values for gradually representing the brightness, by means of converting, for every unit region, said data into said multi-gradation data in accordance with a plurality of pixel values included in the unit region extracted by said region extracting unit.

In addition, a method for generating multi-gradation data according to the present invention comprises a data generating step, a region extracting step, and a multi-gradation data generating step.

The data generating step generates a data having pixel values for the respective pixels which comprise each of characters to represent each of characters in a font.

The region extracting step extracts, for every unit region, the data generated by said data generating step.

The multi-gradation data generating step generates a multi-gradation data including a plurality of gradation values for gradually representing the brightness, by means of converting, for every unit region, said data into said multi-gradation data in accordance with a plurality of pixel values included in the unit region extracted by said region extracting unit.

In addition, the number of pixels in said data generating unit may include the number of pixels obtained by means of multiplying the desired number of pixels by the number of pixels included in said unit region. This data generating unit may generate a data including said number of pixels with a vector font for use in representing a frame of a character with a vector as well as in carrying out thickening processing for each stroke of a character.

The multi-gradation data generating unit may comprise a region reducing unit for generating a multi-gradation data including said desired number of pixels by means of reducing, for every unit region, a plurality of pixels included in the given unit region of said generated multi-gradation data into one representative pixel.

In addition, said apparatus comprises the format converting unit for converting the multi-gradation data generated by said multi-gradation data generating unit into a format of a television signal. A display unit may be provided for displaying the multi-gradation data converted into the television signal format by the format converting unit. The display unit may apply the interlaced scan technique.

In addition, said apparatus may comprise a region setting unit for setting the size of the unit region that should be extracted by said region extracting unit. The region setting unit can set the size of the unit region at any size. For example, the size of said predetermined unit region may be set as k pixels×k pixels. The pixel value of said plurality of pixels may be, for example, monochrome of "1" or "0".

The multi-gradation data generating unit may determine the range of said plurality of gradation values in accordance with the number of pixels included in the unit region extracted by said region extracting unit and the pixel values of these pixels.

The apparatus may comprise weighting unit for calculating a predetermined weight factor to each gradation value of the multi-gradation data generated by said multi-gradation data generating unit, thereby generating a weighted multi-gradation data. For example, it is possible to expand the available range for the light and shade of the character by means of increasing the weight.

According to a method and an apparatus for generating multi-gradation data, the data generated by the data generating unit is extracted for every unit region by the region extracting unit.

Next, the multi-gradation data generating unit looks up the pixel values of the pixels included in the unit region extracted by said region extracting unit. Subsequently, the multi-gradation data generating unit converts, for every unit region, said data into a multi-gradation data including a plurality of gradation values for gradually representing the brightness.

More particularly, a multi-gradation data value becomes large when the unit region contains a thick bar. On the contrary, a multi-gradation data value becomes small when the unit region contains a thin bar.

In addition, said multi-gradation data is displayed on the screen of displaying means. Besides, it is displayed in, for example, black when the multi-gradation data value is large. It is displayed in white when the multi-gradation data value is small.

As a result, if the characters compose a set of sentences, the characters of the multi-gradation data are more clearly recognized especially in a case where small characters are used.

For example, when the multi-gradation characters are displayed on a household television set applying the interlaced scan technique, the characters of the multi-gradation characters are more clearly recognized.

BRIEF DESCRIPTION OF THE DRAWINGS

FIG. 5 is a view showing an example of a multi-gradation data obtained by converting the data according to the second embodiment;

FIG. 6 is a view showing the multi-gradation data for one character according to the second embodiment;

FIG. 7 is a view showing an example of a multi-gradation character according to the second embodiment;

DETAILED DESCRIPTION OF THE PREFERRED EMBODIMENTS

Now described are embodiments of a method and an apparatus for generating multi-gradation data according to the present invention.

Structure of a First Embodiment

Figure 1:
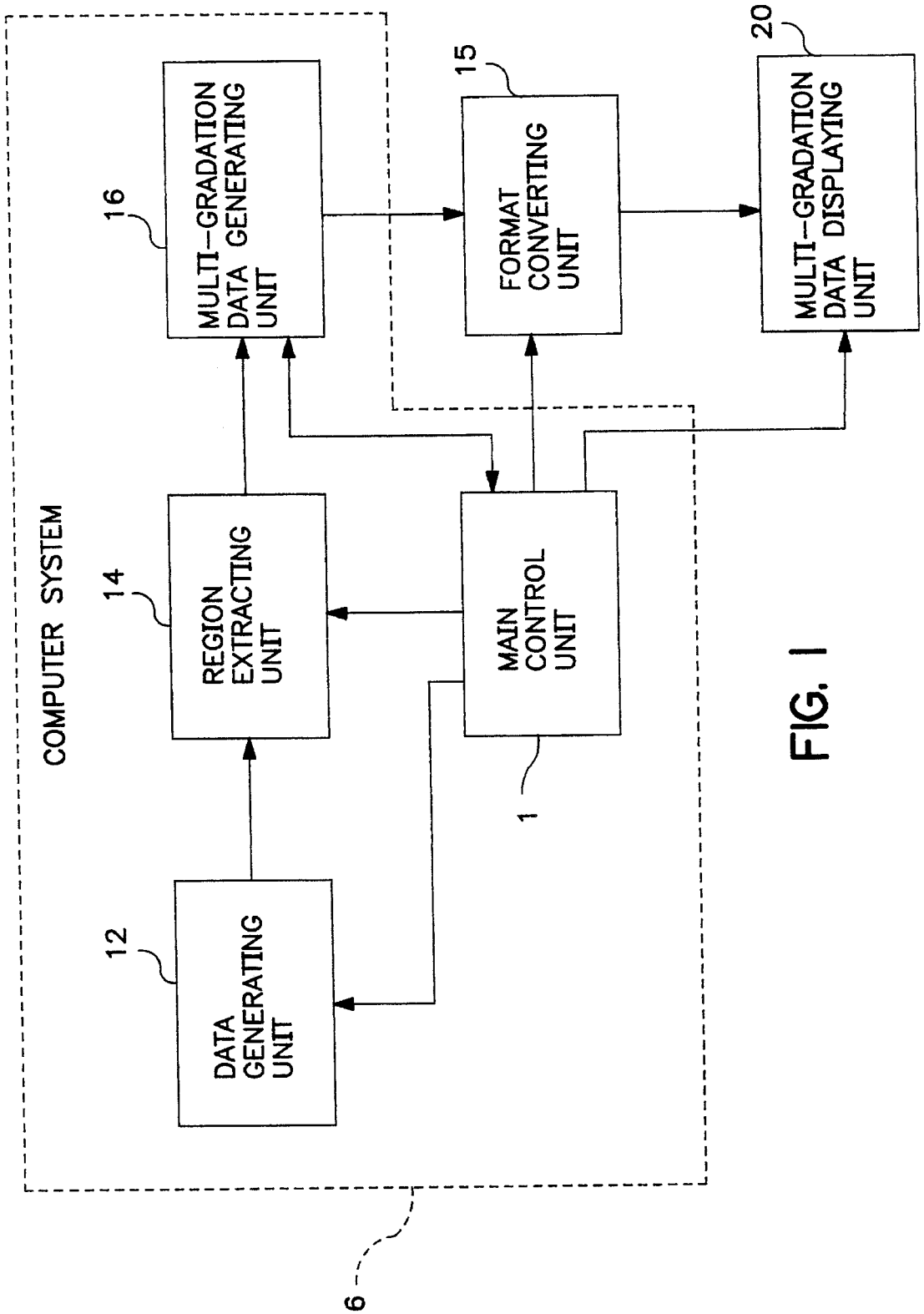
FIG. 1 is a structural block diagram showing an apparatus for generating multi-gradation data according to a first embodiment of the present invention.

FIG. 1 is a structural block diagram showing an apparatus for generating multi-gradation data for use in realizing a method for generating multi-gradation data according to a first embodiment of the present invention.

The apparatus for generating multi-gradation data comprises a computer system 6, a format converting unit 15 and a multi-gradation data displaying unit 20 both of which are connected to the computer system 6. The computer system 6 comprises a main control unit 1, a data generating unit 12, a region extracting unit 14 and a multi-gradation data generating unit 16.

The main control unit 1 is a central processing unit (CPU). The main control unit 1 is connected to the data generating unit 12, the region extracting unit 14, the multi-gradation data generating unit 16, the format converting unit 15 and the multi-gradation data displaying unit 20 to control each component.

The data generating unit 12 generates a data having pixel values for the respective pixels which comprise each of characters for representing each of characters in a font. The pixel value of each pixel may be a value of, for example, either one of "1" and "0". The data generating unit 12 is connected to the region extracting unit 14.

The region extracting unit 14 extracts, for every unit region, the data generated by said data generating unit 12. The region extracting unit 14 is connected to the multi-gradation data generating unit 16.

The multi-gradation data generating unit 16 generates a multi-gradation data including a plurality of gradation values for gradually representing the brightness, by means of converting, for every unit region, said data into the multi-gradation data in accordance with a plurality of pixel values included in the unit region extracted by said region extracting unit 14. In this event, the brightness is the difference between light and dark shades of a color from white to black, represented by said gradation values. The multi-gradation data generating unit 16 is connected to the format converting unit 15.

The format converting unit 15 converts the multi-gradation data generated by the multi-gradation data generating unit 16 into a format of a television signal. The format converting unit 15 is connected to the multi-gradation data displaying unit 20.

The multi-gradation data displaying unit 20 may be, for example, a television set for home use applying the interlaced scan. The multi-gradation font displaying unit 20 displays on a screen the multi-gradation data converted into the television signal format by the format converting unit 15.

Operation of the First Embodiment

Figure 2:
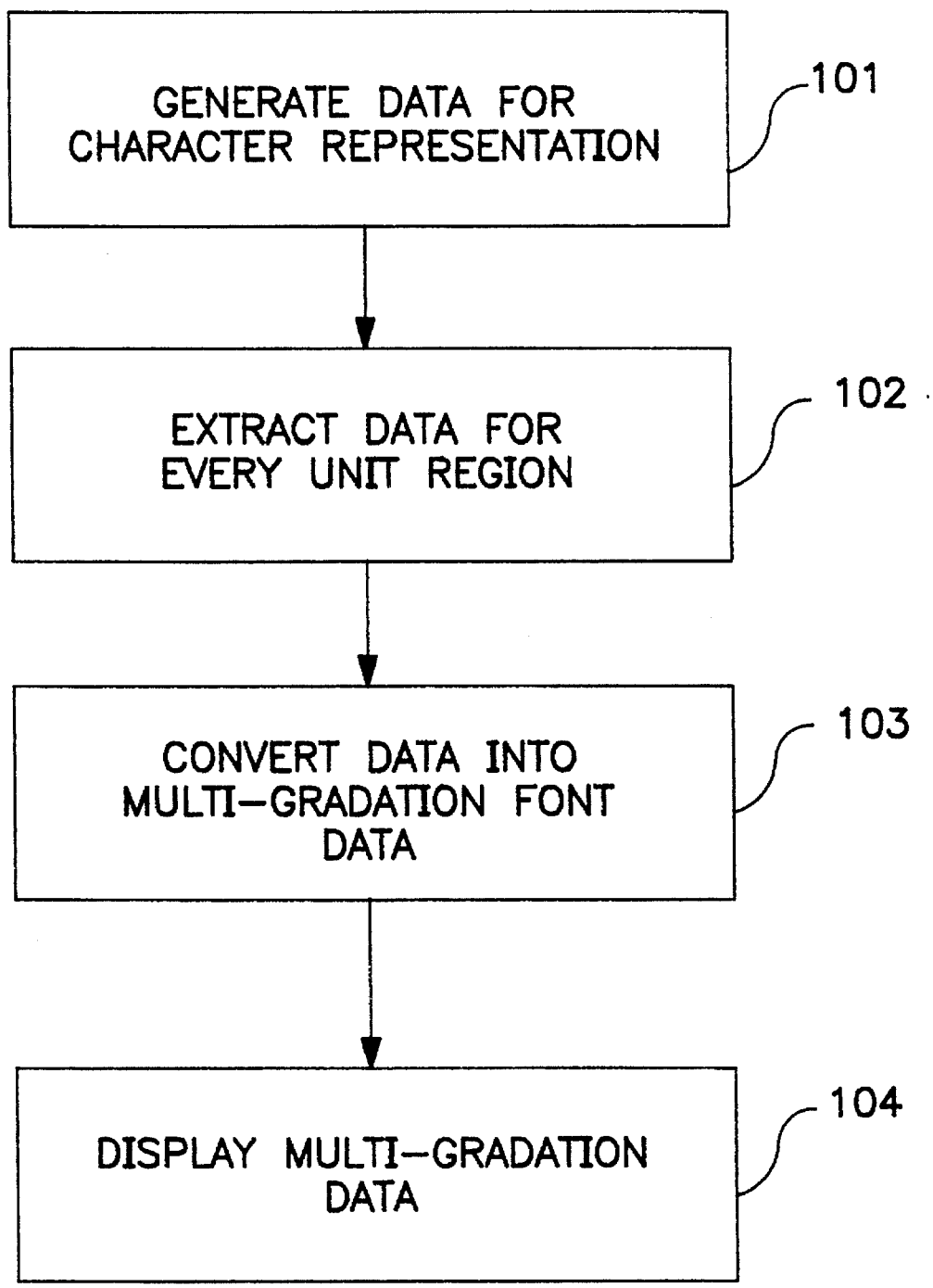
FIG. 2 is a flow chart of a method for generating multi-gradation data according to a first embodiment of the present invention.

Next, a method for generating multi-gradation data is described that is realized by the apparatus structured in the manner above. FIG. 2 is a flow chart showing a method for generating multi-gradation data according to the first embodiment.

First, in the computer system 6, the data generating unit 12 generates a data including pixels values desired pixels (Step 101).

Next, the region extracting unit 14 extracts, for every predetermined unit region, the data generated by the data generating unit 12 (Step 102). In this event, the data may be extracted for every unit region of 2 pixels×2 pixels.

Further, the multi-gradation data generating unit 16 generates a multi-gradation data including a plurality of gradation values for gradually representing the brightness, by means of converting, for every unit region, said data into the multi-gradation data in accordance with the pixel values of the pixels included in the unit region extracted by said region extracting unit 14 (Step 103).

If the unit region is composed of, for example, 2 pixels×2 pixels, the multi-gradation data generating unit 16 sets the gradation values to 0, 1, 2, 3 and 4 for representing the brightness. The multi-gradation data generating unit 16 then calculates a sum of the pixel values of the pixels in the unit region. In this event, if each pixel value is "1" or "0", the sum of the pixel values of four pixels may be one of the values 0 through 4. The sum of the pixel values is determined as the gradation value for the unit region.

More particularly, a multi-gradation font value becomes large when the unit region contains a thick bar. On the contrary, a multi-gradation font value becomes small when the unit region contains a thin bar.

The format converting unit 15 converts the multi-gradation data generated by the multi-gradation data generating unit 16 into the format of a television signal. The multi-gradation data displaying unit 20 displays on a screen the multi-gradation data converted into the television signal format by the format converting unit 15 (Step 104).

Accordingly, the unit region is displayed in, for example, black when the multi-gradation data value is large while the unit region is displayed in white when the multi-gradation data value is small.

Thus, if the characters compose a set of sentences, the characters of the multi-gradation are more clearly recognized especially in a case where small characters are used. As a result, characters of the multi-gradation displayed on a household television set applying the interlaced scan technique are more clearly recognized.

Structure of a Second Embodiment

Figure 3:
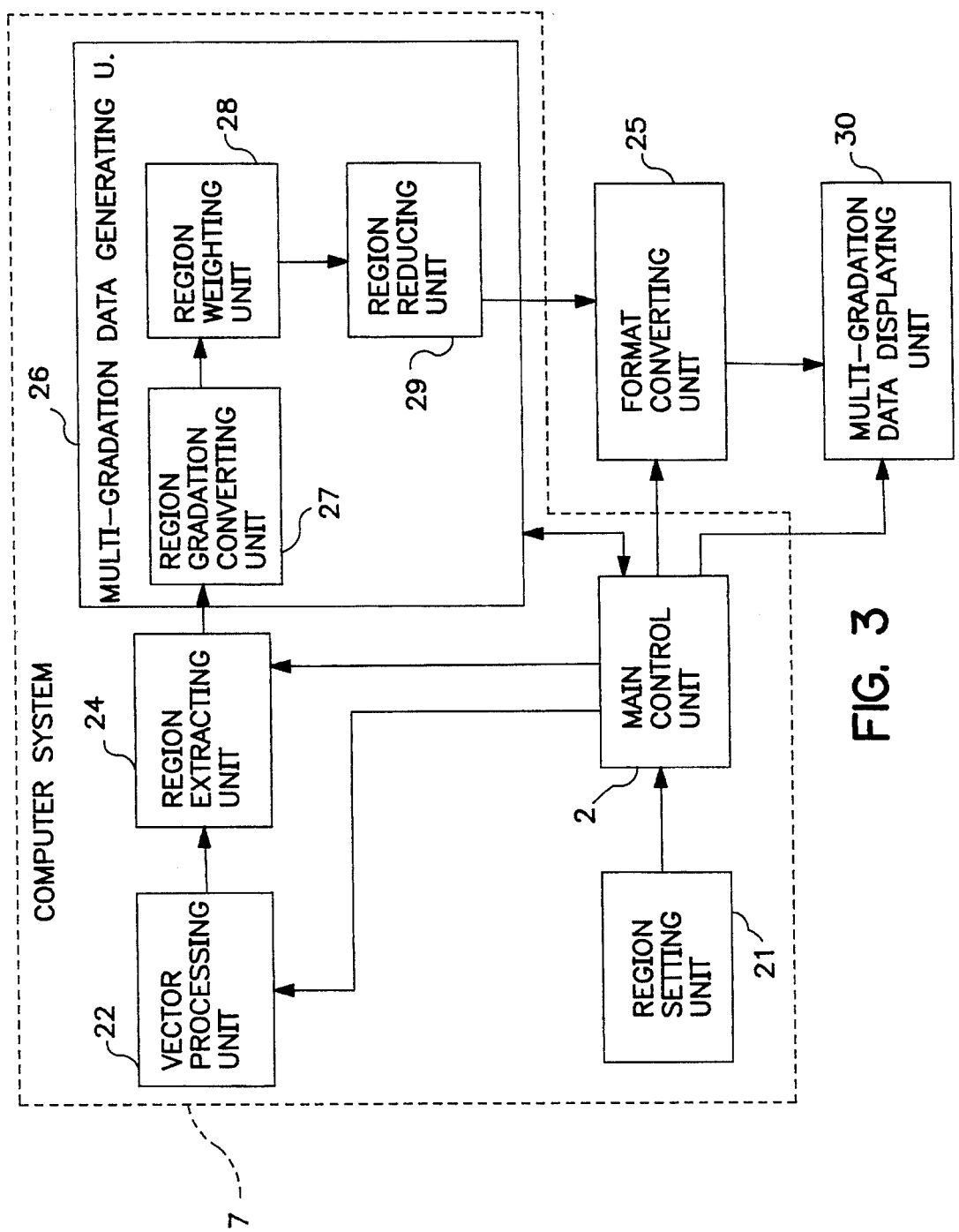
FIG. 3 is a structural block diagram showing an apparatus for generating multi-gradation data according to a second embodiment of the present invention.

FIG. 3 is a structural block diagram showing an apparatus for generating multi-gradation data for use in realizing a method for generating multi-gradation data according to a second embodiment of the present invention.

The apparatus for generating a multi-gradation data comprises a computer system 7, a format converting unit 25 and a multi-gradation data displaying unit 30 both of which are connected to the computer system 7. The computer system 7 comprises a main control unit 2, a vector processing unit 22, a region setting unit 21, a region extracting unit 24 and a multi-gradation data generating unit 26. The main control unit 2 is a central processing unit (CPU).

The main control unit 2 is connected to the vector processing unit 22, the region setting unit 21, the region extracting unit 24, the multi-gradation data generating unit 26, the format converting unit 25 and the multi-gradation data displaying unit 30 to control each component.

The vector processing unit 22 generates a vector data having any number of pixels from a vector font. The vector processing unit 22 generates a vector data including, for example, kn pixels×kn pixels for the data including the desired k pixels×k pixels. The vector font represents a frame of the character with vectors as well as to carry out thickening processing for each stroke (element) of a character. The vector data obtained is an outer configuration data of a character represented in the form of a coordinate data of the character configuration. This vector representation allows generation of high-quality font patterns.

In this event, the pixel value is either "1" (black) or "0" (white). In addition, the desired data consists of the pixel values of, for example, eight pixels×eight pixels. The vector data consists of the pixel values of, for example, twenty-four pixels×twenty-four pixels.

The vector processing unit 22 is connected to the region setting unit 21 such as a keyboard or a mouse device. The region setting unit 21 sets the unit region relative to the vector data including kn pixels×kn pixels. In this event, the size of the unit region is set into, for example, n pixels'n pixels. The size of the unit region is, for example, three pixels×three pixels.

In addition, the vector processing unit 22 is connected to the region extracting unit 24. The region extracting unit 24 extracts, for every unit region set by said region setting unit 21, the vector data including n pixels×n pixels and supplied from the vector processing unit 22. The region extracting unit 24 is connected to the multi-gradation data generating unit 26.

The multi-gradation data generating unit 26 generates a multi-gradation data including a plurality of gradation values for gradually representing the brightness, by means of converting, for every unit region, said vector data into the multi-gradation data in accordance with a plurality of pixel values included in the unit region extracted by said region extracting unit 24.

The multi-gradation data generating unit 26 comprises a region gradation converting unit 27, a region weighting unit 28 and a region reducing unit 29.

The region gradation converting unit 27 calculates, for every unit region, a sum of black pixels of the pixels of the vector data in the given unit region to convert, in accordance with the total pixel value, the vector data into the gradation value of the multi-gradation data in the given unit region.

The region gradation converting unit 27 is connected to the region weighting unit 28. The region weighting unit 28 weights the gradation values of the multi-gradation data. The weighting of the region may be carried out by means of, for example, multiplying the gradation value of the multi-gradation data by a predetermined weight factor.

The region weighting unit 28 is connected to the region reducing unit 29. The region reducing unit 29 generates a multi-gradation data including said desired number of pixels by means of reducing, for said every unit region, a plurality of pixels included in the given unit region of the generated multi-gradation data into one representative pixel. The region reducing unit 29 reduces, for example, the generated multi-gradation data including kn pixels×kn pixels into the multi-gradation data including n pixels×n pixels. The region reducing unit 29 is connected to the format converting unit 25.

The format converting unit 25 converts the multi-gradation data obtained in the region reducing unit 29 into a format of a television signal. The format converting unit 25 is connected to the multi-gradation data displaying unit 30.

The multi-gradation data displaying unit 30 may be, for example, a television set for home use applying the interlaced scan. The multi-gradation data displaying unit 30 displays on a screen the multi-gradation data converted into the television signal format by the format converting unit 25.

Operation of the Second Embodiment

Figure 8:
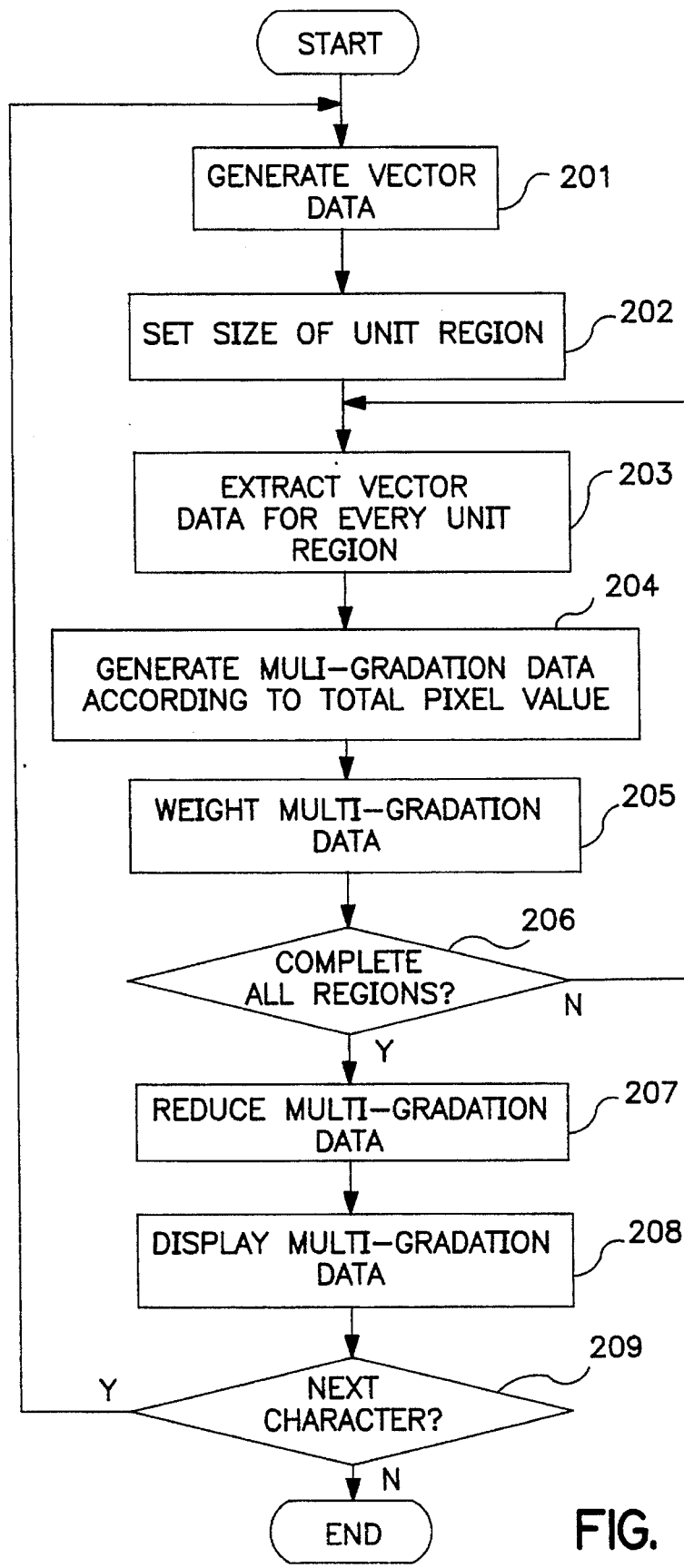
FIG. 8 is a flow chart of a method for generating multi-gradation data according to the second embodiment of the present invention.

FIG. 8 is a flow chart showing a method for generating multi-gradation data according to the second embodiment. Next, described with reference to the drawing is a method for generating multi-gradation data according to the second embodiment. It is noted, in this embodiment, description is made in conjunction with a method for generating a multi-gradation data for an alphabetical character "A".

The vector processing unit 22 generates, in response to an instruction from the main control unit 2, a vector data including, for example, twenty-four pixels×twenty-four pixels for the desired data including, for example, eight pixels×eight pixels (Step 201).

Figure 4:
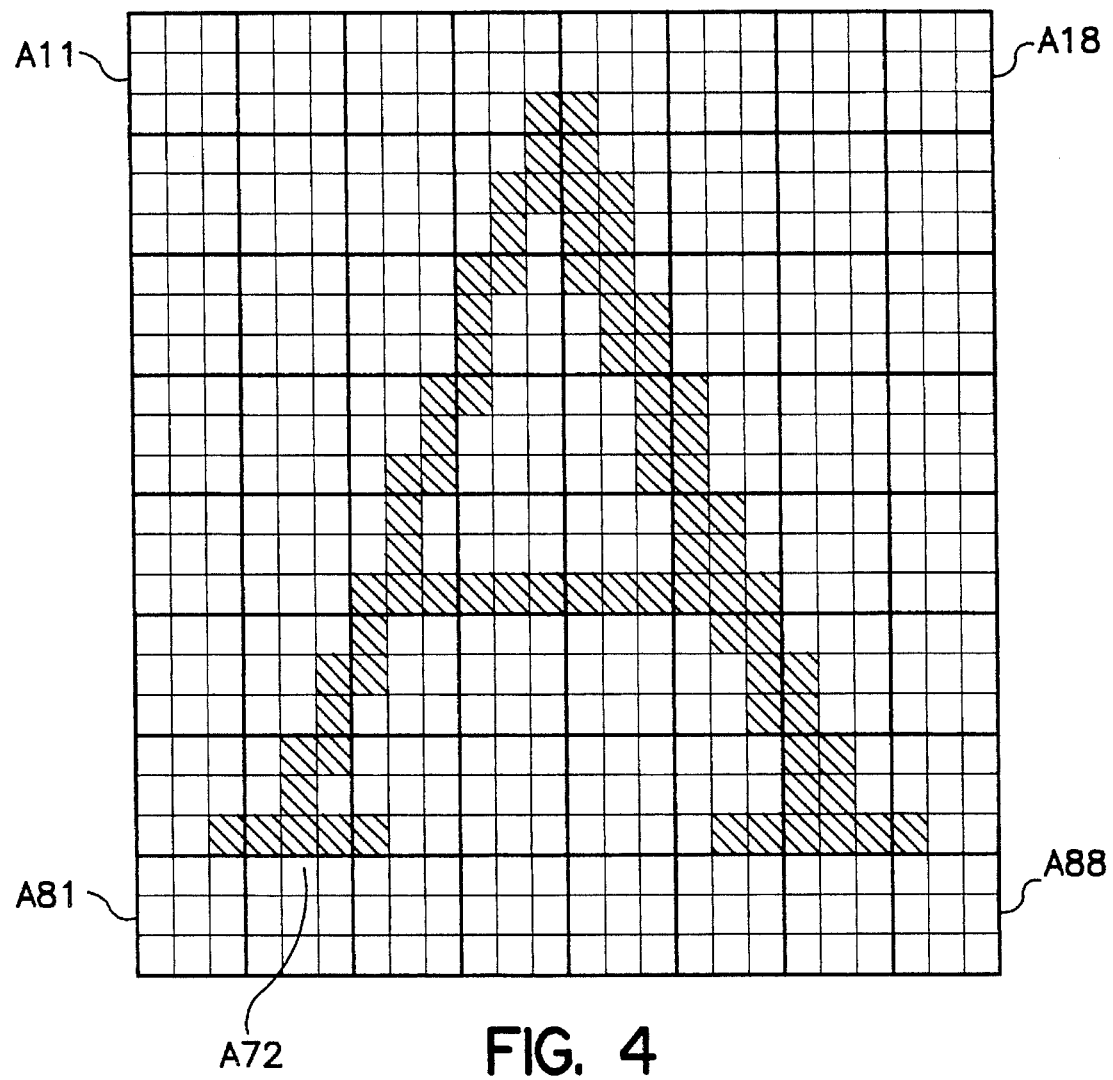
FIG. 4 is a view showing an example of a data generated by the vector generating unit according to the second embodiment.

Then, the region setting unit 21 sets the unit region relating to the vector data including twenty-four pixels× twenty-four pixels (Step 202). In this event, the size of the unit region is set into, for example, three pixels×three pixels. The unit regions including three pixels×three pixels are set as the unit regions $A_{11}$ through $A_{88}$ as shown in FIG. 4.

Next, the region extracting unit 24 subsequently extracts, for every unit region, the vector data included in the given unit region from the vector processing unit 22 in response to an instruction from the main control unit 2 (Step 203). The region extracting unit 24 extracts in the order from the unit region $A_{11}$ to the unit region $A_{18}$, from the unit region $A_{21}$ to the unit region $A_{28}$, . . . , then from the unit region $A_{81}$ to the unit region $A_{88}$.

Further, in the multi-gradation data generating unit 26, the region gradation converting unit 27 calculates, for every unit region, a sum of black pixels of the pixels of the vector data in the given unit region to convert, in accordance with the total pixel value, the vector data into the gradation value of the multi-gradation data in the given unit region (Step 204).

In this event, the size of the unit region is three pixels× three pixels, so that the range of the gradation values may be, for example, nine gradations. The gradation value equal to zero is for white and the gradation value equal to nine is for black. The gradation values from zero to nine are represented with the light and shade from white to black.

For example, as shown in FIG. 5, the unit region $A_{72}$ contains six black pixels. In such a case, the gradation value is "6" and the unit region $A_{72}$ has light and shade grade of closer to black.

Next, the region weighting unit 28 carries out weighting processing on the gradation values of the multi-gradation data of each unit region (Step 205). In this event, for example, the weight factor is equal in number to one. It is noted that the weight factor may be set into two, three or any other values. In this event, the weight factor is multiplied by the multi-gradation data. Accordingly, it is possible to expand the range of the gradation values. As a result, the light and shade grade becomes high to provide more clear appearance of the character.

Further, the multi-gradation data generating unit 26 determines whether the processing of all unit regions is completed (Step 206). If there is any unit region not to be processed yet, Step 203 is again carried out to repeat the processing from Step 203 to Step 205.

If the processing of all of the unit regions is completed, the region reducing unit 29 generates a multi-gradation data including the desired number of pixels by means of reducing, for said every unit region, a plurality of pixels included in the given unit region of the generated multi-gradation data into one representative pixel. The region reducing unit 29 reduces, for example, the generated multi-gradation data including twenty-four pixels×twenty-four pixels into the multi-gradation data including eight pixels×eight pixels (Step 207).

For example, as shown in FIG. 6, the multi-gradation data including eight pixels by eight pixels for the character "A" is obtained.

Next, the format converting unit 25 converts the multi-gradation data obtained in the region reducing unit 29 into a format of a television signal.

In the multi-gradation data displaying unit 30, the multi-gradation data converted by the format converting unit 25 into the television signal format is displayed on a screen through the interlaced scan (Step 208).

For example, as shown in FIG. 7, the multi-gradation data including eight pixels×eight pixels for the character "A" is displayed. As shown in FIG. 8, a thick bar of the character "A" shown in FIG. 4 is displayed on the screen in dark while a thin bar is displayed in light. Though a character with light and shade appears fuzzy, the characters are more clearly recognized with respect to the whole text when it contains small characters.

In the display device of the interlaced scan type flicker results in much. The characters become more visible due to the light and shade processing. That is, when flicker results in a certain line of character, character becomes more visible by gradation values of up and down line of the line.

In addition, the main control unit 2 determines whether there is any character to be processed (Step 209). If there is a character to be processed, the processing starts from Step 201.

According to the second embodiment, the multi-gradation data is used and thus, the amount of data is increased as compared to a conventional data by a gradation number multiple. However, in the second embodiment, the multi-gradation data is directly displayed on the multi-gradation data display unit 30 rather than storing it in a memory or the like. This means that the amount of data to be stored in the memory will never be increased because the multi-gradation data is not stored in the memory or the like.

Structure of a Third Embodiment

Figure 9:
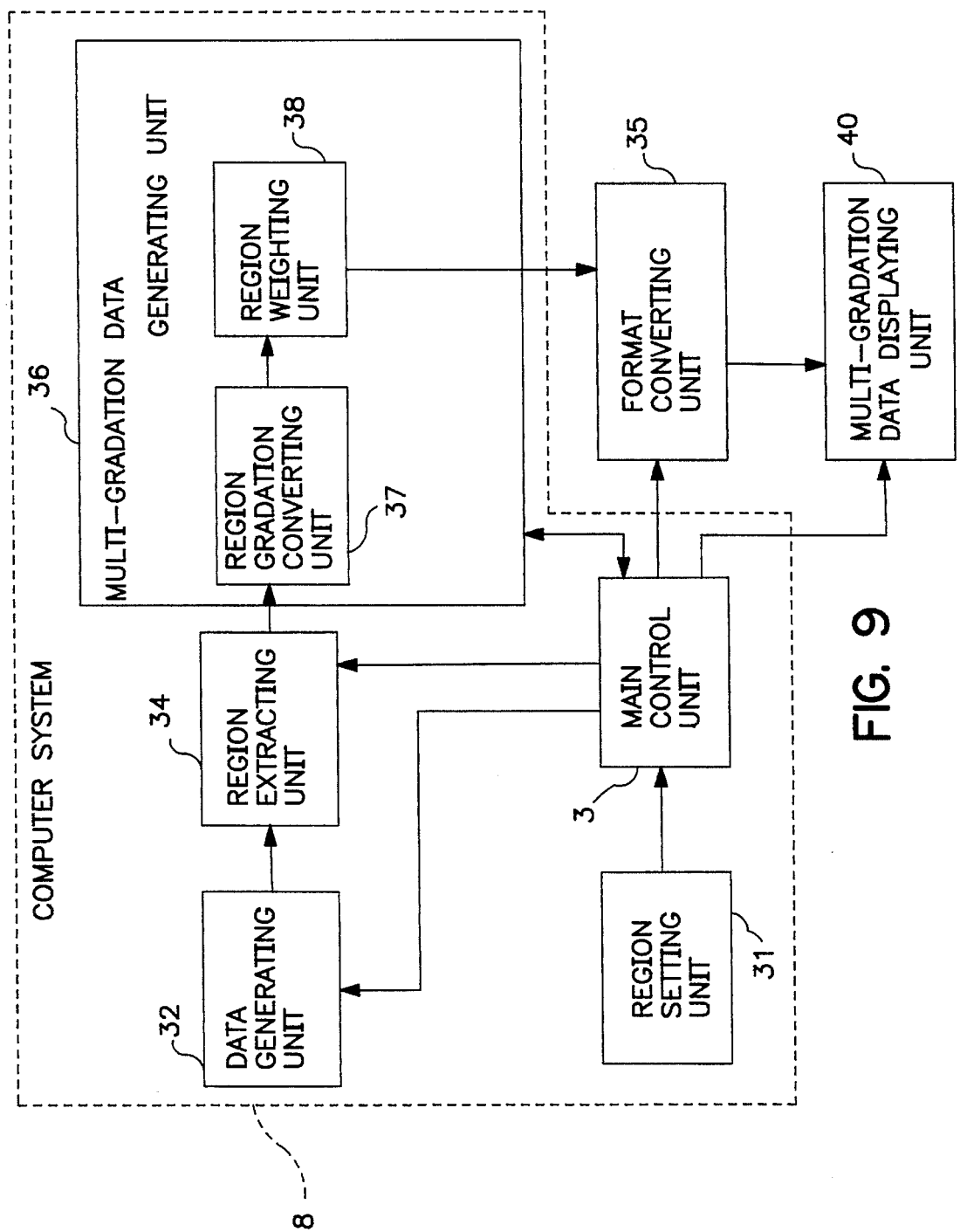
FIG. 9 is a structural block diagram showing an apparatus for generating multi-gradation data according to a third embodiment of the present invention.

FIG. 9 is a structural block diagram showing an apparatus for generating multi-gradation data for use in realizing a method for generating multi-gradation data according to a third embodiment of the present invention.

The apparatus for generating the multi-gradation data comprises a computer system 8, a format converting unit 35 and a multi-gradation data displaying unit 40, both of which are connected to the computer system 8. The computer system 8 comprises a main control unit 3, a data generating unit 32, a region setting unit 31, a region extracting unit 34 and a multi-gradation data generating unit 36. The main control unit 3 is a central processing unit (CPU).

The main control 3 is connected to the data generating unit 32, the region setting unit 31, the region extracting unit 34, the multi-gradation data generating unit 36, the format converting unit 35 and the multi-gradation data displaying unit 40 to control each component.

The data generating unit 32 generates a data having pixel values for each of the plurality of pixels for representing a character. The data consists of a plurality of pixel data (dot data). In addition, the pixel value of each pixel is either "1" or "0".

The data generating unit 32 is connected to the region setting unit 31 such as a keyboard or a mouse device. The region setting unit 31 sets the unit region relative to the data generated by the data generating unit 32. In this event, the size of the unit region is set into, for example, n pixels×n pixels. The size of the unit region is, for example, two pixels×two pixels. The data generating unit 32 is connected to the region extracting unit 34.

The region extracting unit 34 extracts the data generated by the data generating unit 32 for every unit region set by the region setting unit 31. The region extracting unit 34 is connected to the multi-gradation data generating unit 36.

The multi-gradation data generating unit 36 generates a multi-gradation data including a plurality of gradation values for gradually representing the brightness, by means of converting, for said every unit region, the data into the multi-gradation data in accordance with a plurality of pixel values included in the unit region extracted by said region extracting unit 34. In this event, the brightness is the difference between light and dark shades of a color from white to black, represented by said gradation values.

The multi-gradation data generating unit 36 comprises a region gradation converting unit 37 and a region weighting unit 38.

The region gradation converting unit 37 calculates, for every unit region, a sum of black pixels of the pixels of the data in the given unit region to convert, in accordance with the total pixel value, the data into the gradation value of the multi-gradation data in the given unit region. The pixel value of the black pixel is, for example, "1", while the pixel value of the white pixel is "0".

The region gradation converting unit 37 is connected to the region weighting unit 38. The region weighting unit 38 weights the gradation values of the multi-gradation data. The weighting of the region may be carried out by means of, for example, multiplying the gradation value of the multi-gradation data by a predetermined weight factor. The region weighting unit 38 is connected to the format converting unit 35.

The format converting unit 35 converts the multi-gradation data obtained in the region weighting unit 38 into a format of a television signal. The format converting unit 35 is connected to the multi-gradation data displaying unit 40. The multi-gradation data displaying unit 40 may be, for example, a television set for home use applying the interlaced scan. The multi-gradation data displaying unit 40 displays on a screen the multi-gradation data converted into the television signal format by the format converting unit 35.

Operation of the Third Embodiment

Figure 10:
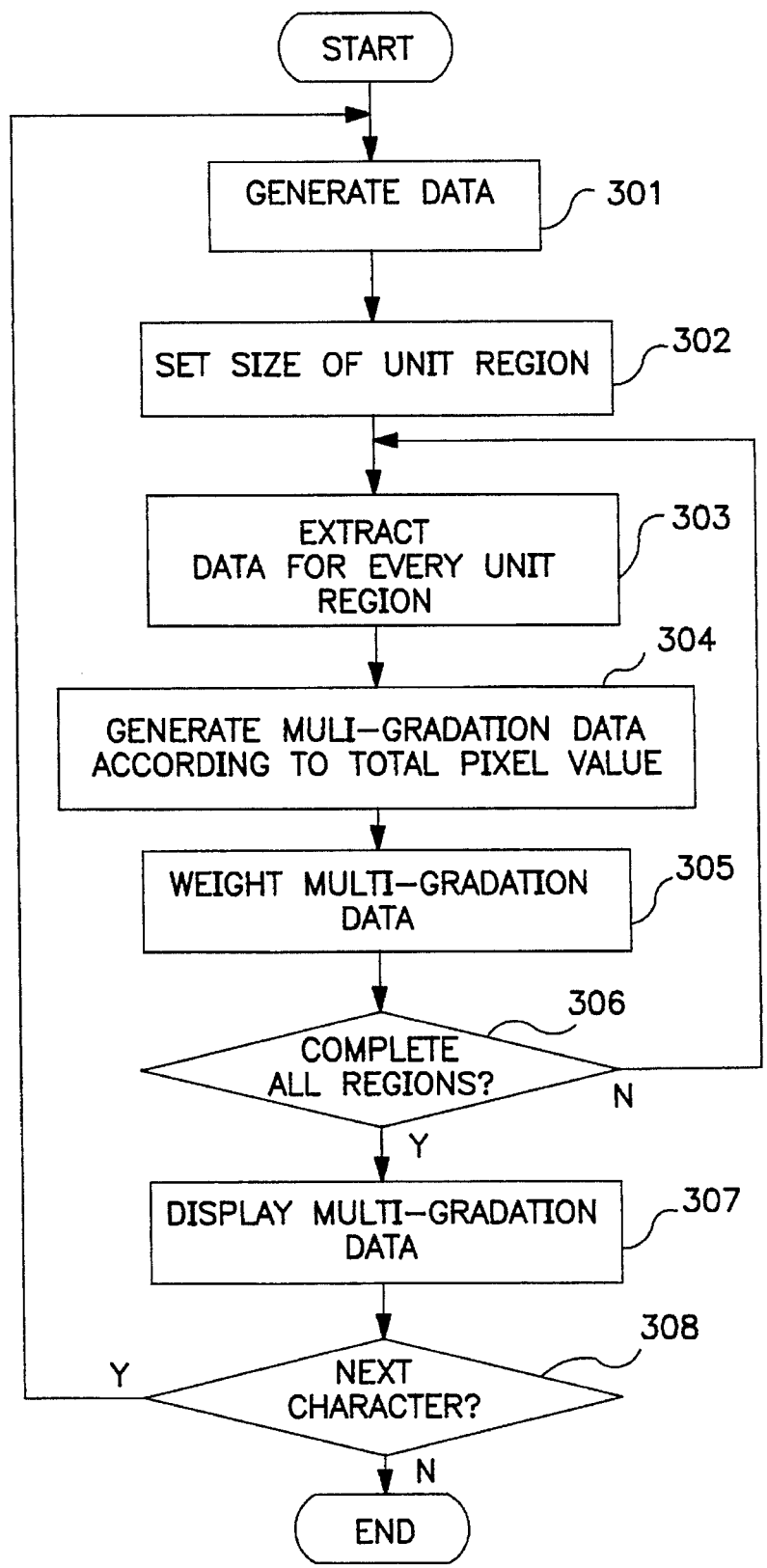
FIG. 10 is a flow chart of a method for generating multi-gradation data according to the third embodiment of the present invention.

FIG. 10. is a flow chart showing a method for generating multi-gradation data according to the third embodiment. Next, described with reference to the drawing is a method for generating multi-gradation data according to the third embodiment.

In this embodiment, description is made in conjunction with a method for generating a multi-gradation data for a kanji character called "cho" in mincho. The data for kanji is assumed as sixteen pixels×sixteen pixels. The size of the unit region is, for example, two pixels×two pixels.

Figures 11, 12:
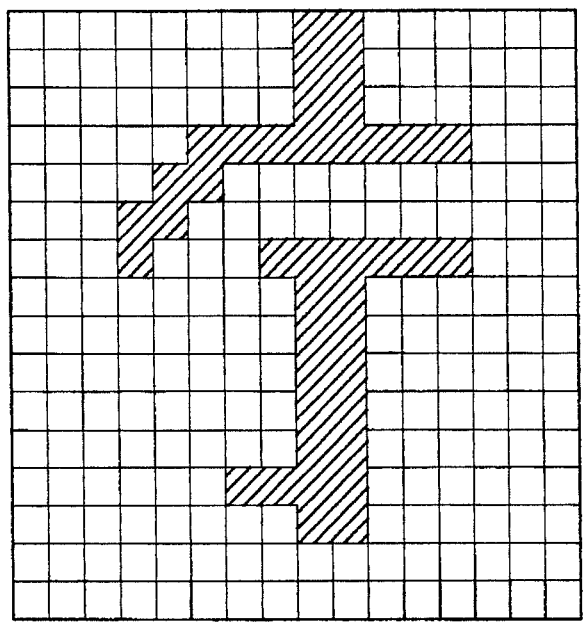
FIG. 11 is a view showing an example of a data according to the third embodiment.
FIG. 12 is a view showing the multi-gradation data for one character according to the third embodiment.

The data generating unit 32 generates a data with pixel values of the pixels consisting the kanji character called "cho" (Step 301). The data of the kanji character called "cho" including sixteen pixels×sixteen pixels is shown in FIG. 11.

Then, the region setting unit 31 sets the unit region relating to the data including sixteen pixels×sixteen pixels (Step 302). In this event, the size of the unit region is set into, for example, two pixels×two pixels.

Next, the region extracting unit 34 extracts, for every unit region, the data supplied from the data generating unit 32 in response to an instruction from the main control 3 (Step 303). The region extracting unit 34 extracts in the order from the unit region $A_{11}$ to the unit region $A_{18}$, from the unit region $A_{21}$ to the unit region $A_{28}$, ..., then from the unit region $A_{81}$ to the unit region $A_{88}$.

Further, in the multi-gradation data generating unit 36, the region gradation converting unit 37 calculates, for every unit region, a sum of black pixels of the pixels of the data in the given unit region to convert, in accordance with the total pixel value, the data into the gradation value of the multi-gradation data in the given unit region (Step 304).

In this event, the size of the unit region is two pixels×two pixels, so that the range of the gradation values may be, for example, four gradations. The gradation value equal to zero is for white and the gradation value equal to four is for black. The gradation values from zero to four are represented with the light and shade from white to black.

Next, the region weighting unit 38 carries out weighting processing on the gradation values of the multi-gradation data of each unit region (Step 305). In this event, for example, the weight factor is equal in number to one.

Further, the multi-gradation data generating unit 36 determines whether the processing of all of the unit regions is completed (Step 306). If there is any unit region not to be processed yet, Step 303 is again carried out to repeat the processing from Step 303 to Step 305.

If the processing of all of the unit regions is completed, the multi-gradation data including sixteen pixels×sixteen pixels is obtained, as shown in FIG. 12, for the kanji character.

Next, the format converting unit 35 converts the multi-gradation data obtained by the region weighting unit 38 into a format of a television signal.

In the multi-gradation data displaying unit 40, the multi-gradation data converted into the television signal format is displayed on a screen through the interlaced scan (Step 307).

Figure 13:
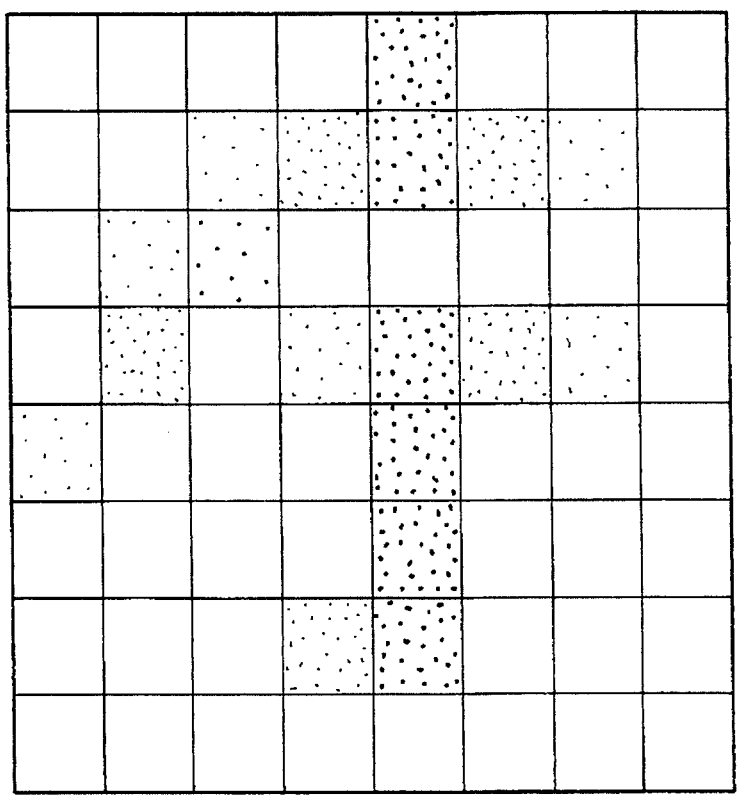
FIG. 13 is a view showing an example of a multi-gradation character according to the third embodiment.

For example, as shown in FIG. 13, the multi-gradation data including sixteen pixels×sixteen pixels for the kanji character is displayed. As shown in FIG. 13, a thick bar of the kanji character shown in FIG. 11 is displayed on the screen in dark while a thin bar is displayed in light. Though a character with light and shade appears fuzzy, the characters are more clearly recognized with respect to the whole text when it contains small characters.

In addition, the main control unit 3 determines whether there is any character to be processed (Step 308). If there is a character to be processed, the processing starts from Step 301.

As mentioned above, the same effect can be obtained as the second embodiment for the characters such as kanji in the third embodiment.

While the above-mentioned second and third embodiments use the pixel values of the pixels included in the unit region for weighting the gradation values of the unit region, the gradation values in the unit region may be weighted by means of, for example, referring the pixel values of the pixels existing outside the unit region.

What is claimed is:

1. A method for generating multi-gradation data comprising:

a data generating step for generating a data having pixel values for respective pixels which comprise each of a plurality of characters in a font, and for dividing the respective pixels into a plurality of unit regions, a number of the respective pixels being obtained by multiplying a desired number of pixels by a number of pixels included in one unit region of said plurality of unit regions;

a region extracting step for extracting, for every unit region of said plurality of unit regions, said data generated by said data generating step;

a multi-gradation data generating step for generating a multi-gradation data including a plurality of gradation values each gradually representing a different pixel brightness value, by converting, for every said unit region, said data into said multi-gradation data in accordance with a plurality of pixel values included in said unit region extracted by said region extracting step, and for reducing said number of the respective pixels to said desired number of pixels by representing each said unit region including said number of pixels with one pixel having a pixel value determined in accordance with said multi-gradation value;

a format converting step for converting the multi-gradation data generated in said multi-gradation data generating step into a format of an interlaced television signal; and a displaying step for displaying the multi-gradation data converted into the interlaced television signal format by the format converting step.

2. A method for generating multi-gradation data as claimed in claim 1 further comprising a region setting step for setting a size of the unit region to be extracted at said region extracting step.

3. A method for generating multi-gradation data as claimed in claim 2, wherein the region setting step sets the size of the unit region to be extracted at said region extracting step to k pixels×k pixels.

4. A method for generating multi-gradation data as claimed in claim 1, wherein said multi-gradation data generating step determines a range of said plurality of gradation values in accordance with the number of pixels included in the unit region extracted at said region extracting step and the pixel values of said pixels.

5. A method for generating multi-gradation data as claimed in claim 4, wherein the pixel value of said pixels is either "1" or "0".

6. A method for generating multi-gradation data as claimed in claim 1, wherein said data generating step generates data including said number of pixels with a vector font for use in representing a frame of a character with a vector and for use in implementing a process for widening each stroke of a character.

7. A method for generating multi-gradation data as claimed in claim 1, further comprising a weight step for multiplying a predetermined weight factor by each gradation value of the multi-gradation data generated at said multi-gradation data generating step to generate weighted multi-gradation data.

8. A method for generating multi-gradation data as claimed in claim 1, wherein in said data generating step, the plurality of characters comprise one sentence, each of the plurality of characters being a small character, said displaying step displays each character using the multi-gradation data converted into the format of television signal.

9. An apparatus for generating multi-gradation data comprising:

data generating means for generating a data having pixel values for respective pixels which comprise each of a plurality of characters in a font, and for dividing the respective pixels into a plurality of unit regions, a number of the respective pixels being obtained by multiplying a desired number of pixels by a number of pixels included in one unit region of said plurality of unit regions;

region extracting means for extracting, for every unit region of said plurality of unit regions, said data generated by said data generating step;

multi-gradation data generating means for generating a multi-gradation data including a plurality of gradation values each gradually representing a different pixel brightness value, by converting, for every said unit region, said data into said multi-gradation data in accordance with a plurality of pixel values included in said unit region extracted by said region extracting step, and for reducing said number of the respective pixels to said desired number of pixels by representing each said unit region including said number of pixels with one pixel having a pixel value determined in accordance with said multi-gradation value;

format converting means for converting the multi-gradation data generated by said multi-gradation data generating means into a format of an interlaced television signal; and displaying means for displaying the multi-gradation data converted into the interlaced television signal format by the format converting means by applying an interlaced scanning technique.

10. An apparatus for generating multi-gradation data as claimed in claim 9 further comprising region setting means for setting a size of the unit region to be extracted by said region extracting means.

11. An apparatus for generating multi-gradation data as claimed in claim 10, wherein the size of the unit region to be extracted by said region extracting means is k pixels×k pixels.

12. An apparatus for generating multi-gradation data as claimed in claim 9, wherein said multi-gradation data generating means determines a range of said plurality of gradation values in accordance with the number of pixels included in the unit region extracted by said region extracting means and the respective pixel values of said pixels.

13. An apparatus for generating multi-gradation data as claimed in claim 12, wherein the pixel value of said pixels is either "1" or "0".

14. An apparatus for generating multi-gradation data as claimed in claim 9, wherein said data generating means generates data including a number of pixels with a vector font for use in representing a frame of a character with a vector and for use in implementing a process for widening each stroke of a character.

15. An apparatus for generating multi-gradation data as claimed in claim 9, further comprising weighting means for multiplying a predetermined weight factor by each gradation value of the multi-gradation data generated at said multi-gradation data generating step to generate weighted multi-gradation data.

16. An apparatus for generating multi-gradation data comprising:

data generating means for generating a data having pixel values for respective pixels which comprise each of a plurality of characters in a font;

multi-gradation data generating means for generating a multi-gradation data including a plurality of gradation values each gradually representing a different pixel brightness value, by converting said data generated by said data generating means into said multi-gradation data;

format converting means for converting the multi-gradation data generated by said multi-gradation data generating means into a format of an interlaced television signal; and displaying means for displaying the multi-gradation data converted into the interlaced television signal format by the format converting means by applying an interlaced scanning technique.

17. An apparatus for generating multi-gradation data comprising:

data generating means for generating a data having pixel values for respective pixels which comprise each of a plurality of characters in a font;

region extracting means for extracting the data generated by said data generating means into a plurality of regions;

multi-gradation data generating means for generating a multi-gradation data including a plurality of gradation values each gradually representing a different pixel brightness value, by converting said generated data into said multi-gradation data in accordance with a plurality of pixel values included in said unit region extracted by said region extracting means;

format converting means for converting the multi-gradation data generated by said multi-gradation data generating means into a format of an interlaced television signal; and displaying means for displaying the multi-gradation data converted into the interlaced television signal format by the format converting means by applying an interlaced scanning technique.

18. A method of generating multi-gradation data comprising:

a data generating step for generating a data having pixel values for respective pixels which comprise each of a plurality of characters in a font;

a multi-gradation data generating step for generating a multi-gradation data including a plurality of gradation values each gradually representing a different pixel brightness value, by converting said data generated in the data generating step into said multi-gradation data;

a format converting step for converting said multi-gradation data generated in the multi-gradation data generating step into a format of an interlaced television signal; and a displaying step for displaying said multi-gradation data converted into the interlaced television signal format by the format converting step.

19. A method of generating multi-gradation data comprising:

a data generating step for generating a data having pixel values for respective pixels which comprise each of a plurality of characters in a font;

a region extracting step for extracting said data generated in said data generating step into a plurality of unit regions;

a multi-gradation data generating step for generating a multi-gradation data including a plurality of gradation values each gradually representing a different pixel brightness value, by converting said data generated in the data generating step into said multi-gradation data in accordance with a plurality of pixel values included in the unit region extracted by said region extraction step;

a format converting step for converting said multi-gradation data generated in the multi-gradation data generating step into a format of an interlaced television signal; and a displaying step for displaying said multi-gradation data converted into the interlaced television signal format by the format converting step.

20. A computer for generating multi-gradation data comprising:

data generating means for generating a data having pixel values for respective pixels which comprise each of a plurality of characters in a font;

multi-gradation data generating means for generating a multi-gradation data including a plurality of gradation values for gradually representing brightness, by converting said data generated by said data generating means into said multi-gradation data; and format converting mean for converting said multi-gradation data generated by said multi-gradation data generating means into a format of an interlaced television signal and for outputting said converted signal.

21. A computer for generating multi-gradation data comprising:

data generating means for generating a data having pixel values for respective pixels which comprise each of a plurality of characters in a font;

region extracting mean for extracting said data generated by said data generating means into a plurality of regions;

multi-gradation data generating means for generating a multi-gradation data including a plurality of gradation values for gradually representing brightness, by converting said generated data into said multi-gradation data in accordance with a plurality of pixel values included in said unit region extracted by said region extracting means; and format converting means for converting the multi-gradation data generated by said multi-gradation data generating means into a format of an interlaced television signal and for outputting said converted signal.

22. A computer for generating multi-gradation data comprising:

data generating means for generating a data having pixel values for respective pixels which comprise each of a plurality of characters in a font, for dividing the respective pixels into a plurality of unit regions, a number of the respective pixels including a number of pixels obtained by multiplying a desired number of pixels by a number of pixels included in one unit of said plurality of unit regions;

region extracting means for extracting, for every unit region of said plurality of unit regions, said data generated by said data generating means;

multi-gradation data generating means for generating a multi-gradation data including a plurality of gradation values for gradually representing brightness, by converting, for every said unit region, said data into said multi-gradation data in accordance with a plurality of pixel values included in said unit region extracted by said region extracting means, generating multi-gradation data including said desired number of pixels by reducing, for every said unit region, a plurality of pixels included in said unit region of said data generated by said data generating step into one representative pixel; and format converting means for converting the multi-gradation data generated by said multi-gradation data generating means into a format of an interlaced television signal and for outputting said converted signal.

23. A computer for generating multi-gradation data as claimed in claim 22, wherein said multi-gradation data generating means generates said multi-gradation data including said desired number of pixels by reducing, for every unit region, a plurality of pixels included in a given unit region of said multi-gradation data generated by said data generating means into one representative pixel.

24. A computer for generating multi-gradation data as claimed in claim 22, further comprising region setting means for setting a size of the unit region to be extracted by said region extracting means.

25. A computer for generating multi-gradation data as claimed in claim 24, wherein said size of said unit region to be extracted by said region extracting means is k pixels×k pixels.

26. A computer for generating multi-gradation data as claimed in claim 22, wherein said multi-gradation data generating means determines a range of said plurality of gradation values in accordance with said number of pixels included in said unit region extracting means and said respective pixel values of said pixels.

27. A computer for generating multi-gradation data as claimed in claim 26, wherein said respective pixel values of said pixels is either "1" or "0".

28. A computer for generating multi-gradation data as claimed in claim 22, wherein said data generating means generates data including a number of pixels with a vector font for use in representing a frame of character with a vector and for use in implementing a process for widening each stroke of a character.

* * * * *